Sept. 8, 1931. F. E. DAVIS 1,822,131
SPRING SUSPENSION FOR SIX-WHEEL VEHICLES
Filed July 3, 1929 2 Sheets-Sheet 1

Inventor:
Floyd E. Davis
By his Attorneys
Redding, Greeley, O'Shea & Campbell

Sept. 8, 1931.  F. E. DAVIS  1,822,131
SPRING SUSPENSION FOR SIX-WHEEL VEHICLES
Filed July 3, 1929  2 Sheets-Sheet 2
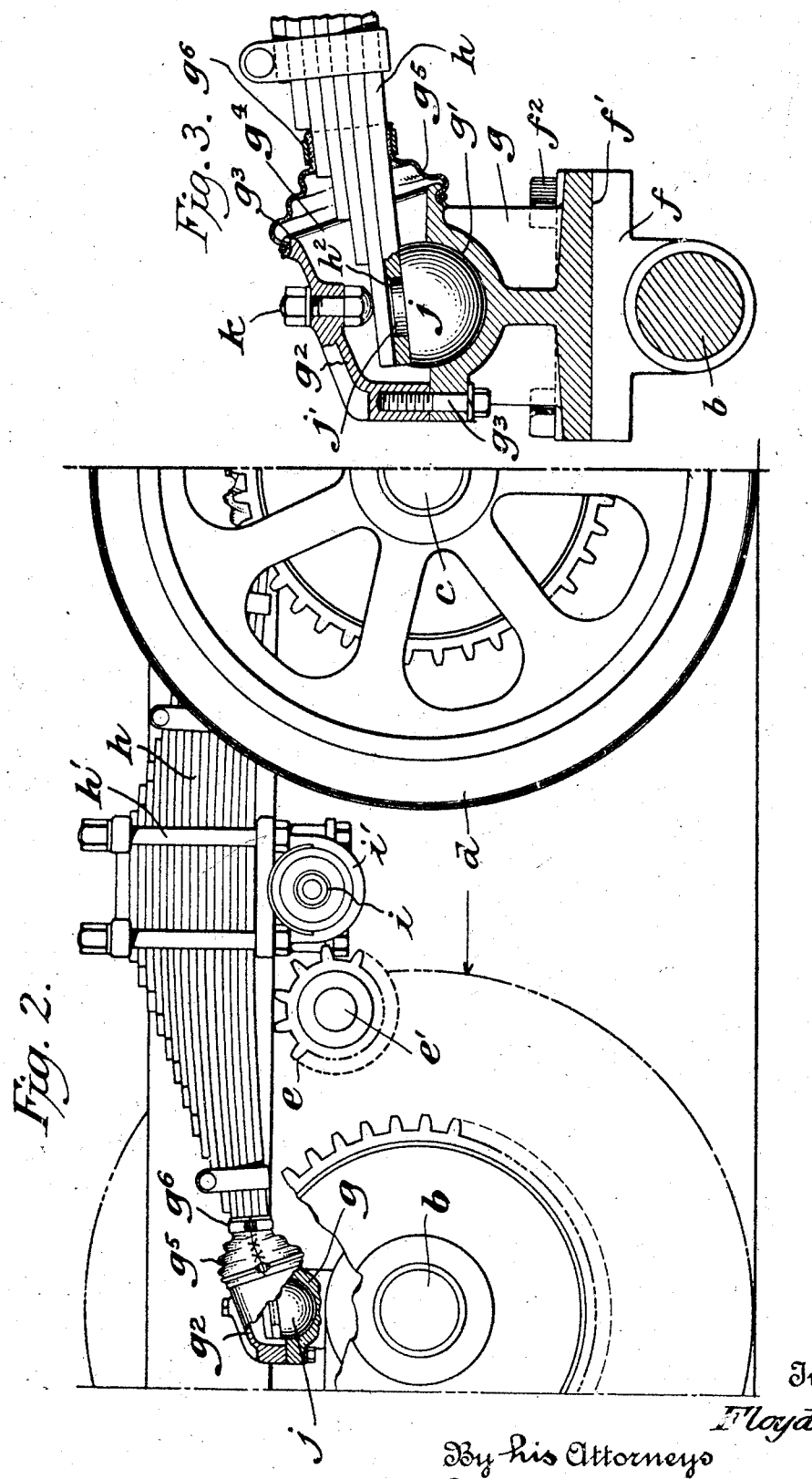

Patented Sept. 8, 1931

1,822,131

UNITED STATES PATENT OFFICE

FLOYD E. DAVIS, OF ALLENTOWN, PENNSYLVANIA, ASSIGNOR TO INTERNATIONAL MOTOR COMPANY, OF NEW YORK, N. Y., A CORPORATION OF DELAWARE

SPRING SUSPENSION FOR SIX-WHEEL VEHICLES

Application filed July 3, 1929. Serial No. 375,684.

The present invention relates to spring suspensions for motor vehicles and embodies, more specifically, an improved spring suspension for a vehicle of the four wheel drive type in which a plurality of driving wheels are mounted upon the frame at either side thereof. The fore and aft axles carrying the respective parts of spring suspensions not only partake of relative movement with respect to the vehicle frame while remaining in a horizontal position, but also move pivotally with respect thereto about either extremity thereof. Where the ends of the springs are secured to the axles without provision for relative movement, save in vertical planes, the pivotal movement of the axle about either end thereof sets up a twisting force in the spring which is highly deleterious.

With a view to affording a connection between the spring ends and axles of such character that the leaves of the springs will be relieved of such twisting force, the present invention has been designed and the resulting structure affords a highly flexible spring suspension which is far more serviceable than existing forms which include a more positive type of connection at the spring ends.

An object of the invention, therefore, is to provide a spring suspension in which provision is made for relative movement between the axle and spring ends in a plurality of planes.

A further object of the invention is to provide a spring suspension of the above character in which an improved form of connection between the ends of the spring and the axles is provided, this connection involving elements which permit relative, lateral, or rocking motion of the spring with respect to the axle.

The attainment of the above objects is accomplished by means of a ball and socket connection between each end of the springs on either side of the vehicle and the respective axles.

Figure 2 is a view in side elevation, partly broken away and in section, showing the spring suspension of Figure 1.

Figure 3 is a view in section, taken on line 3—3 of Figure 1, and looking in the direction of the arrows.

Figure 1:
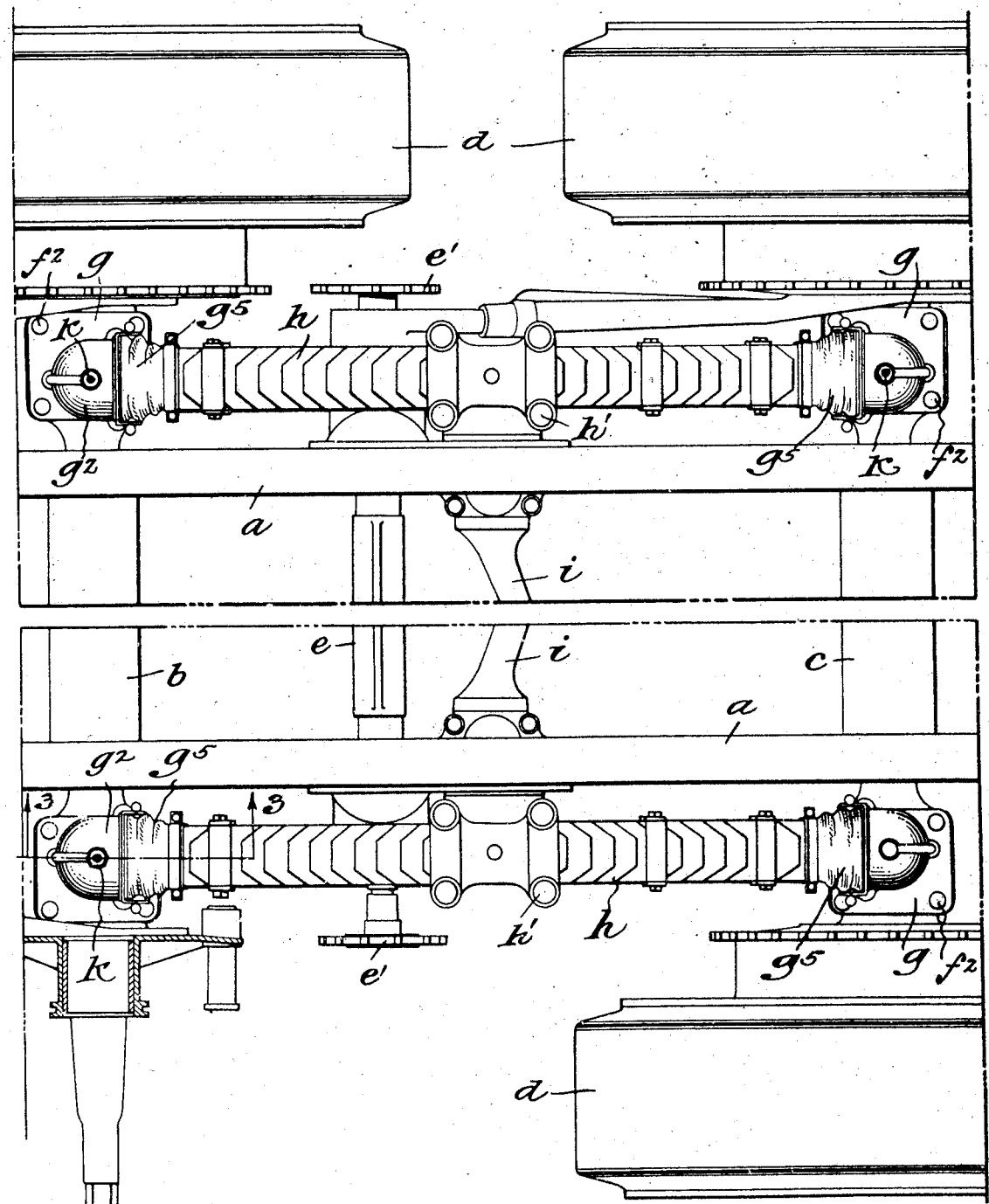
Figure 1 is a plan view showing a pair of axles mounted upon the frame through a spring suspension constructed in accordance with the present invention.

Referring to the above drawings, $a$ designates the side frame members of a motor vehicle chassis having fore and aft axles $b$ and $c$, respectively. Wheels $d$ are mounted on the axles and are driven from driving sprockets $e'$ carried by jack shafts $e$. This construction follows well known practice in motor vehicle design and forms no part of the present invention.

Upon the axles $b$ and $c$, brackets $f$ are mounted. These brackets are formed with finished faces $f'$ upon which brackets $g$ are mounted by means of bolts $f^2$. Brackets $g$ are formed with spherical bearing surfaces $g'$ and cover plates $g^2$ are secured thereto by means of bolts $g^3$.

Springs $h$ are secured to the outer extremities of an anchor tube $i$ by means of bolts $h'$, the anchor tube having blocks $i'$ journaled thereon and receiving the bolts $h'$. The extremities of springs $h$ are formed with apertures $h^2$ and rest upon bearing members $j$ having spherical surfaces which are received in the bearings $g'$. Upwardly extending portions $j'$ are received in the recesses $h^2$ and thus prevent sliding of the extremities of the springs $h$ with respect to the spherical bearing member $j$.

Adjustable bolts $k$ are mounted in the cover plates $g^2$ and bear upon the extremities of the spring $h$, thus preventing the spring ends from becoming dislodged from the bearing members $j$. Annular grooves $g^3$ are formed about the apertures $g^4$ of the cover plates and flexible boots $g^5$ may be secured in the grooves and to the springs $g^6$ to prevent the accumulation of foreign matter within the cover plates when the ends of the springs are received therein.

From the foregoing description, it will be apparent that the spherical bearing members $j$ are capable of movement in any direction with respect to the relatively stationary brackets $g$. Should an axle be moved out of the horizontal position, the relative movement of the axle pivotally about the corresponding end of one of the springs will be taken up by the spherical bearing member.

In this manner, no twisting stresses are impressed upon the springs, regardless of the character of the movement of any of the axles and a highly flexible and serviceable construction results.

While the invention has been described with specific reference to the constructions shown in the accompanying drawings, it is not to be limited, save as defined in the appended claim.

I claim as my invention:

In a spring suspension for motor vehicles, a spring, an axle, means to secure the spring to the vehicle frame, a bracket carried by the axle and formed with a spherical bearing seat, a spherical bearing on the spring, an apertured cover plate carried by the bracket and receiving an end of the spring, and means carried by the cover plate for preventing the bearing from leaving the seat.

This specification signed this 25th day of June A. D. 1929.

FLOYD E. DAVIS.